(12) United States Patent
Gist

(10) Patent No.: US 6,922,086 B2
(45) Date of Patent: Jul. 26, 2005

(54) METHOD AND APPARATUS FOR GENERATING AN INPUT SWITCHING REFERENCE

(75) Inventor: William B. Gist, Chelmsford, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 10/329,879

(22) Filed: Dec. 26, 2002

(65) Prior Publication Data

US 2004/0124906 A1 Jul. 1, 2004

(51) Int. Cl.[7] .................................................. H03K 5/22
(52) U.S. Cl. ........................... 327/78; 327/77; 327/530
(58) Field of Search ........................... 327/77, 78, 102, 327/530, 552, 554

(56) References Cited

U.S. PATENT DOCUMENTS

| | | | |
|---|---|---|---|
| 4,672,238 A * | 6/1987 | Nemoto ..................... 327/58 |
| 5,870,031 A | 2/1999 | Kaiser et al. ........... 340/825.54 |
| 5,886,565 A | 3/1999 | Yasui et al. ................ 327/530 |
| 6,104,216 A * | 8/2000 | Satoh ......................... 327/78 |
| 6,177,815 B1 | 1/2001 | Baumgartner et al. ....... 327/76 |
| 6,215,336 B1 * | 4/2001 | Ohashi ....................... 327/77 |
| 6,278,312 B1 | 8/2001 | Dabral et al. .............. 327/310 |
| 2002/0158673 A1 * | 10/2002 | McClure et al. ............. 327/78 |
| 2003/0164720 A1 * | 9/2003 | Self ........................... 327/77 |

OTHER PUBLICATIONS

European Search Report dated Apr. 16, 2004 (3 pgs). 23223/007EPI.

* cited by examiner

*Primary Examiner*—Terry D. Cunningham
(74) *Attorney, Agent, or Firm*—Osha Liang LLP

(57) ABSTRACT

A method and apparatus for generating a reference voltage potential, also known as an input switching reference, using differential clock signals or other differential signals that ideally have a 180 degree phase shift is provided. The differential signals are generated by a transmitting circuit. The reference voltage potential is dependent on the differential signals. The voltage potentials of the differential signals are averaged and low-pass filtered. Comparators in a receiving circuit compare an input signal's voltage potential to the reference voltage potential to determine if the transmitted input signal is a binary one or binary zero.

25 Claims, 5 Drawing Sheets

METHOD AND APPARATUS FOR GENERATING AN INPUT SWITCHING REFERENCE

BACKGROUND OF INVENTION

It is often necessary to transfer information between elements in a digital computer system. In some situations, information is transmitted from a transmitting circuit to a receiving circuit across a data line. The information is typically transmitted as a voltage potential for a predetermined time interval. The voltage potential of the transmitted signal may be affected by attenuation due to parasitics, signal noise due to coupling with other signals, and power supply noise due to active switching of circuit elements in the digital computer system. As a result, the characteristics of the voltage potential received at the receiving circuit may not be ideal.

A typical receiving circuit compares the voltage potential of the transmitted signal against a reference voltage potential. If the voltage potential of the transmitted signal is greater than the reference voltage potential, a binary one is indicated by the receiving circuit. Alternatively, if the voltage potential of the input signal is less than the reference voltage potential, a binary zero is indicated by the receiving circuit.

Typically, the reference voltage potential, also known in the art as a "switching reference voltage," is generated on a printed circuit board. A voltage divider connected to a power supply on the printed circuit board may be used to generate the reference voltage potential. The reference voltage line that transmits the reference voltage potential has parasitics that include impedances from the printed circuit board trace, the integrated circuit package, the integrated circuit, and the connections between the three elements.

The reference voltage potential is commonly charge-coupled to a power supply on the integrated circuit. The parasitics on the reference voltage line and the charge-coupling form a low-pass filter. The low-pass filter helps remove unwanted high-frequency noise in the reference voltage potential.

FIG. 1 shows a typical reference voltage potential circuit (100). A voltage divider including resistors R5 (102) and R2 (104) are connected between power supplies $V_{DD}$ (101) and $V_{SS}$ (103). The resistors' (102, 104) values determine the reference voltage potential (105). The resistors (102, 104) and power supplies (101, 103) may reside on a printed circuit board. The power supplies (101, 103) and reference voltage potential (105) are transmitted to an integrated circuit (110). The lines that transmit the voltage potentials of the power supplies (101, 103) and reference voltage potential (105) to the integrated circuit (110) have impedances represented by Z5 (130), Z7 (150), and Z3 (106), respectively. The voltage potentials affected by the impedances (130, 150, 106) are transmitted to the integrated circuit (110) by lines (132, 152, 107), respectively.

The integrated circuit (110) and the package (not shown) that allows the integrated circuit to be mounted to the printed circuit board, add additional impedances to the lines (132, 152, 107). The additional impedances are represented by Z6 (140), Z8 (160), and Z4 (108), respectively. The reference voltage potential (109) on the integrated circuit (110) is charge-coupled to the power supplies (134, 154) on the integrated circuit (110) through capacitors C1 (120) and C2 (122), respectively.

FIG. 2 shows a timing diagram (200) of a reference voltage potential circuit. The power supply difference signal (201) shows the absolute difference between power supplies $V_{DD}$ and $V_{SS}$, for example, the absolute difference between power supplies (134, 154) shown in FIG. 1. A reference voltage signal (203) shows a reference voltage potential resulting from a voltage divider circuit, for example, the voltage divider using R5 (102) and R2 (104) shown in FIG. 1. The reference voltage signal (203) is dependent on the power supply difference signal (201).

In FIG. 2, clock signals (205, 207) are transmitted from a transmitting circuit to a receiving circuit. The clock signals (205, 207) are affected by attenuation due to parasitics, signal noise due to coupling with other signals, and/or power supply noise due to active switching of circuit elements in the digital computer system. The reference voltage signal (203) is not depend on the clock signals (205, 207), is not centered with respect to the clock signals (205, 207), and is not dependent on the receiving circuit's semiconductor process, temperature, voltage, and/or input termination impedance.

SUMMARY OF INVENTION

According to one aspect of the present invention, a communication system comprises a first input arranged to receive a first signal from a transmitting circuit; a second input arranged to receive a second signal from the transmitting circuit where the transmitting circuit has a first characteristic change profile based on at least one of the group consisting of the transmitting circuit's manufacturing process, temperature, and supply voltage; and a reference voltage circuit located on an integrated circuit where the integrated circuit has a second characteristic change profile based on at least one of the group consisting of the integrated circuit's manufacturing process, temperature, and supply voltage where the transmitting circuit is not formed on the integrated circuit.

According to one aspect of the present invention, a communication system comprises a first input arranged to receive a first signal from a transmitting circuit; a second input arranged to receive a second signal from the transmitting circuit; and a reference voltage circuit located on an integrated circuit comprises a first p-channel transistor where the first p-channel transistor's gate is operatively connected to the first input; a second p-channel transistor where the second p-channel transistor's gate is operatively connected to the second input; a first n-channel transistor where the first n-channel transistor's gate is operatively connected to the first input; and a second n-channel transistor where the second n-channel transistor's gate is operatively connected to the second input, and where the transmitting circuit is not formed on the integrated circuit.

According to one aspect of the present invention, a method for generating a reference voltage in a communication system comprises inputting a first signal generated from a transmitting circuit; inputting a second signal generated from the transmitting circuit; and generating a voltage reference potential dependent on the first signal and the second signal and where the generating occurs on an integrated circuit where the transmitting circuit is not formed on the integrated circuit.

According to one aspect of the present invention, a communication system comprises means for inputting a first signal generated from a transmitting circuit; means for inputting a second signal generated from the transmitting circuit; and means for generating a voltage reference potential dependent on the first signal and the second signal where the generating occurs on an integrated circuit, and where the transmitting circuit is not formed on the integrated circuit.

Other aspects and advantages of the invention will be apparent from the following description and the appended claims.

DETAILED DESCRIPTION

Embodiments of the present invention provide a reference voltage potential, also known as an "input switching reference," using differential clock signals or other differential signals that ideally have a 180 degree phase shift. The differential signals are generated by a transmitting circuit. The reference voltage potential is dependent on the differential signals. The voltage potentials of the differential signals are averaged and low-pass filtered by a receiving circuit to generate a reference voltage potential that tracks a transmitted input signal.

Figure 1:
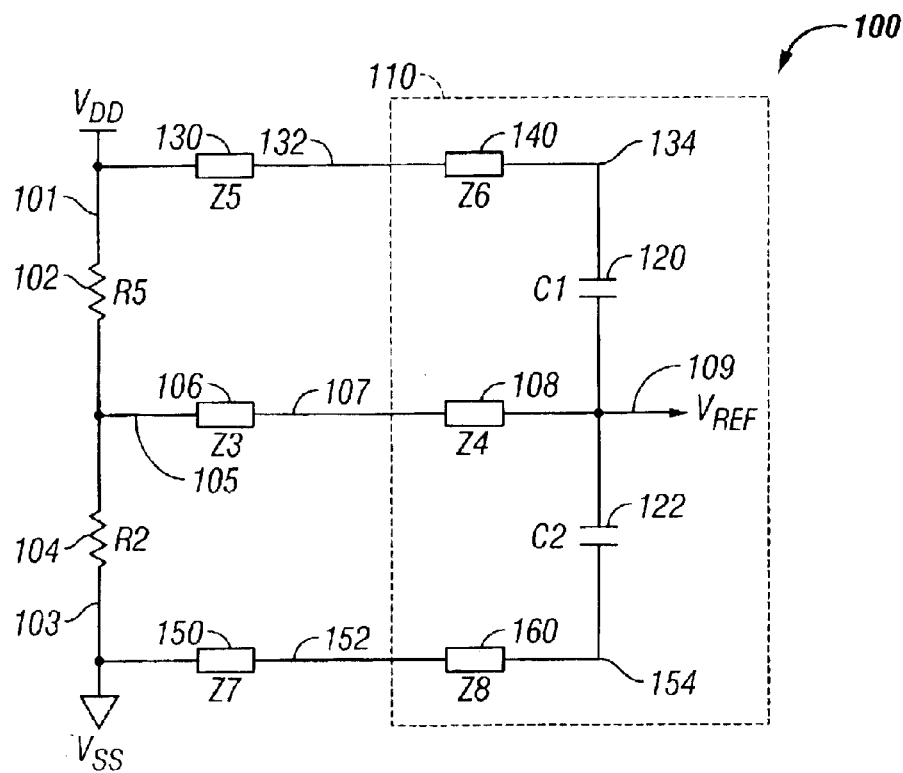
FIG. 1 shows an example of a prior art reference voltage potential circuit.
Figure 2:
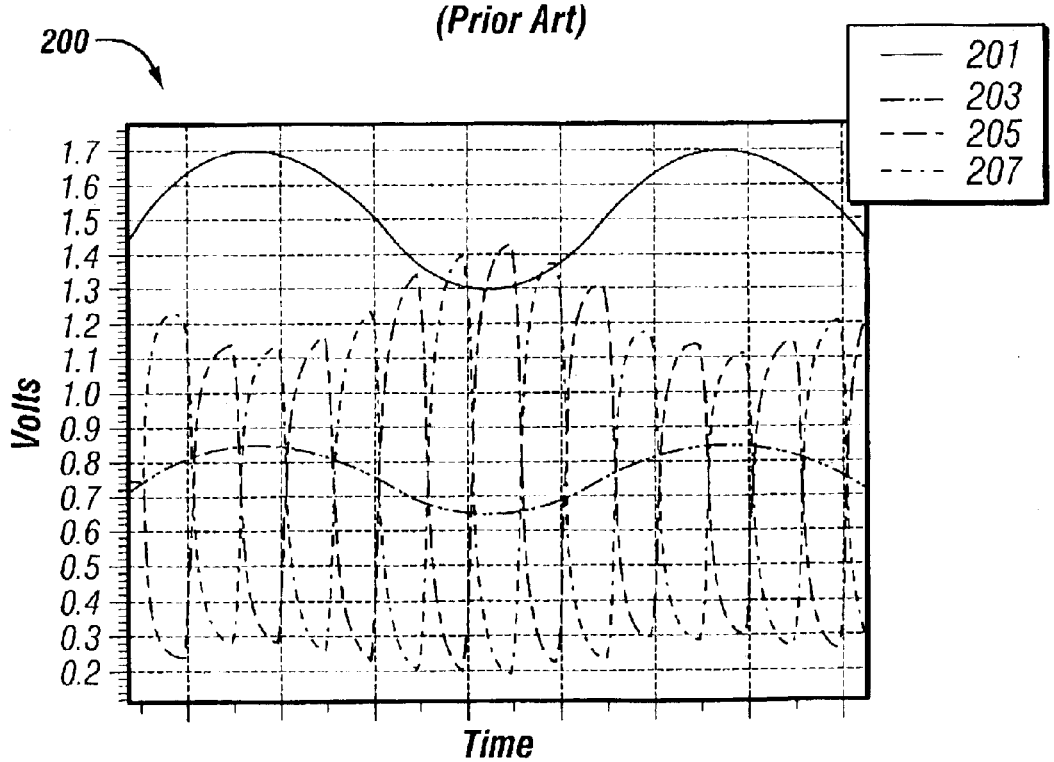
FIG. 2 shows an example of a timing diagram of a prior art reference voltage potential circuit.
Figure 3:
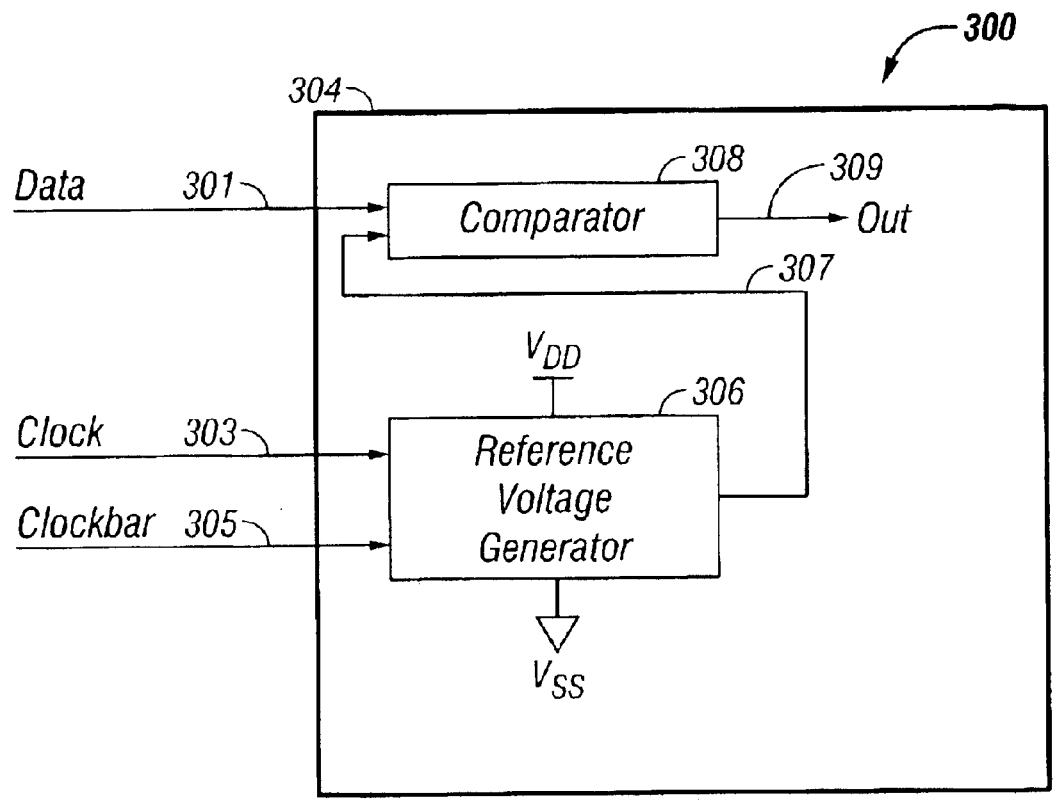
FIG. 3 shows a block diagram of a receiving circuit in accordance with an embodiment of the present invention.

FIG. 3 shows a block diagram of a receiving circuit (300) in accordance with an embodiment of the present invention. Differential clock signals, clock signal (303) and clockbar signal (305), ideally have a 180 degree phase shift relative to each other. The differential clock signals are transmitted from a transmitting circuit (not shown) such that the differential clock signals may have similar characteristics as the data signal (301). In other words, attenuation due to parasitics, signal noise due to coupling with other signals, and/or power supply noise due to active switching of circuit elements in a digital computer system affect both the data signal (301) and the differential clock signals (303,305).

The differential clock signals (i.e., clock signal (303) and clockbar signal (305)) continuously toggle between a first state and a second state. Toggling of the differential clock signals produces voltage potentials that may be identified as different states.

In this embodiment, the differential clock signals (i.e., clock signal (303) and clockbar signal (305)) are input to a reference voltage generator (306). The differential clock signals are used to produce a reference voltage potential on signal line (307). The power supplies $V_{DD}$ and $V_{SS}$ are charge-coupled to the signal line (307) to provide a low-pass filter of the reference voltage potential on signal line (307). A comparator (308) compares the data signal (301), or input signal, voltage potential to the reference voltage potential on the signal line (307). If the voltage potential of the data signal (301) is greater than the reference voltage potential, a voltage potential representative of a binary one is output by the comparator (308) on the output signal line (309). Alternatively, if the voltage potential of the data signal (301) is less than the reference voltage potential on signal line (307), a voltage potential representative of a binary zero is output by the comparator (308) on the output signal line (309).

The reference voltage generator (306) and the comparator (308) are included on the same integrated circuit (304). Changes in the operating characteristics of the integrated circuit (304) due to process variations, temperature, voltage, and input termination impedance may advantageously effect both the reference voltage generator (306) and the comparator (308). The integrated circuit (304) has a characteristic change profile that may be based on the integrated circuit's manufacturing process, temperature, and/or supply voltage. The integrated circuit's characteristic change profile may be different from the characteristic change profile of the transmitting integrated circuit (not shown).

One of ordinary skill in the art will understand that the data signal (301) may be transmitted using a single-end data line. The data signal (301) may be transmitted using differential data lines. A single-end data line and a differential data line may be latched in the receiving circuit by a clock signal. The clock signal may be the clock signal (303), the clockbar signal (305), a combination of both the clock signal (303) and the clockbar signal (305), or a different clock signal.

Figure 4:
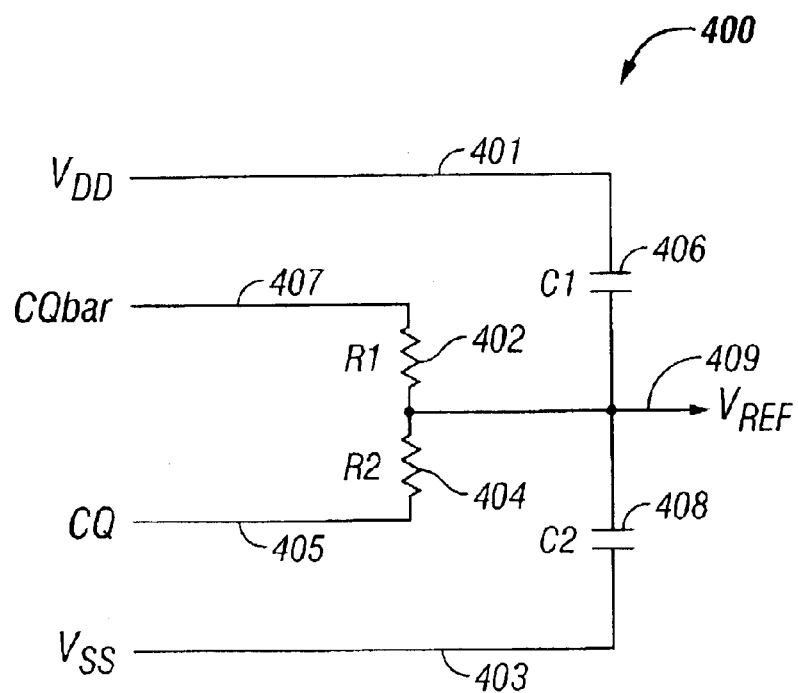
FIG. 4 shows a schematic diagram of a reference voltage potential circuit in accordance with an embodiment of the present invention.

FIG. 4 shows a schematic diagram of a reference voltage potential circuit (400) in accordance with an embodiment of the present invention. Reference voltage potential circuits (400) are also known in the art as a "reference voltage generator" or "reference voltage circuit." Differential clock signals, CQ signal (405) and CQbar signal (407), ideally have a 180 degree phase shift relative to each other. The differential clock signals continuously toggle between a first state and a second state. Toggling of the differential clock signals produces voltage potentials that may be identified as different states.

The differential clock signals (i.e., CQ signal (405) and CQbar signal (407)) are input to a voltage divider that includes resistors R1 (402) and R2 (404). The resistors R1 (402) and R2 (404) are connected between the differential clock signals, CQbar signal (407) and CQ signal (405). The resistors' (402, 404) values determine the reference voltage potential, $V_{REF}$, on a voltage reference signal line (409). The resistors R1 (402) and R2 (404) may be formed from resistive elements, known in the art such as, resistors, material used in semiconductor manufacture of gates, material used in semiconductor manufacture of metal, material used in semiconductor manufacture of a via or connector between layers, material used in the semiconductor manufacture of active area conductive regions, and/or a transistor's inherent "on"or "off" resistance.

The resistors' (402, 404) values may be equal so that the reference voltage potential, $V_{REF}$, is an absolute average of the differential clock signals, CQbar signal (407) and CQ signal (405). In other words, $$V_{REF}=|V_{CQBAR}+V_{CQ}|/2, \tag{1}$$

where $V_{CQBAR}$ is the voltage potential of the CQbar signal (407) and $V_{CQ}$ is the voltage potential of the CQ signal (405). The resistors' (402, 404) values may be weighted so that the reference voltage potential, $V_{REF}$, is a weighted average. In other words, the reference voltage potential, $V_{REF}$, has a voltage potential between the voltage potential of the CQbar signal (407) and the voltage potential of the CQ signal (405).

In FIG. 4, power supplies $V_{DD}$ (401) and $V_{SS}$ (403) are charge-coupled to the reference voltage potential, $V_{REF}$, on the voltage reference signal line (409) to provide a low-pass filter of the reference voltage potential, $V_{REF}$. The low-pass filter cutoff frequency may be selected base upon the frequency with which the CQ signal (405) and CQbar signal (407) switch. The cutoff frequency may be below the maximum switching frequency of the CQ signal (405) and/or CQbar signal (407).

One of ordinary skill in the art will understand that both the signals, CQ signal (405) and CQbar signal (407) may not continuously toggle. Both the CQ signal (405) and CQbar signal.(407) may be at a fixed voltage potential. Both CQ signal (405) and CQbar signal (407) may toggle for a limited time duration then maintain a fixed voltage potential, or vice versa. The reference voltage potential circuit (400) operates properly if a the CQbar signal (407) and the CQ signal (405) are complementary or maintain a consistent voltage potential.

One of ordinary skill in the art will understand that one of the signals, CQ signal (405) and CQbar signal (407) may be disconnected from the reference voltage potential circuit (400). By continuing to toggle, the remaining signal, CQ signal (405) or CQbar signal (407), maintains an appropriate reference voltage potential, $V_{REF}$, on the voltage reference signal line (409) while the disconnected signal has a voltage potential that "floats."

Figure 5:
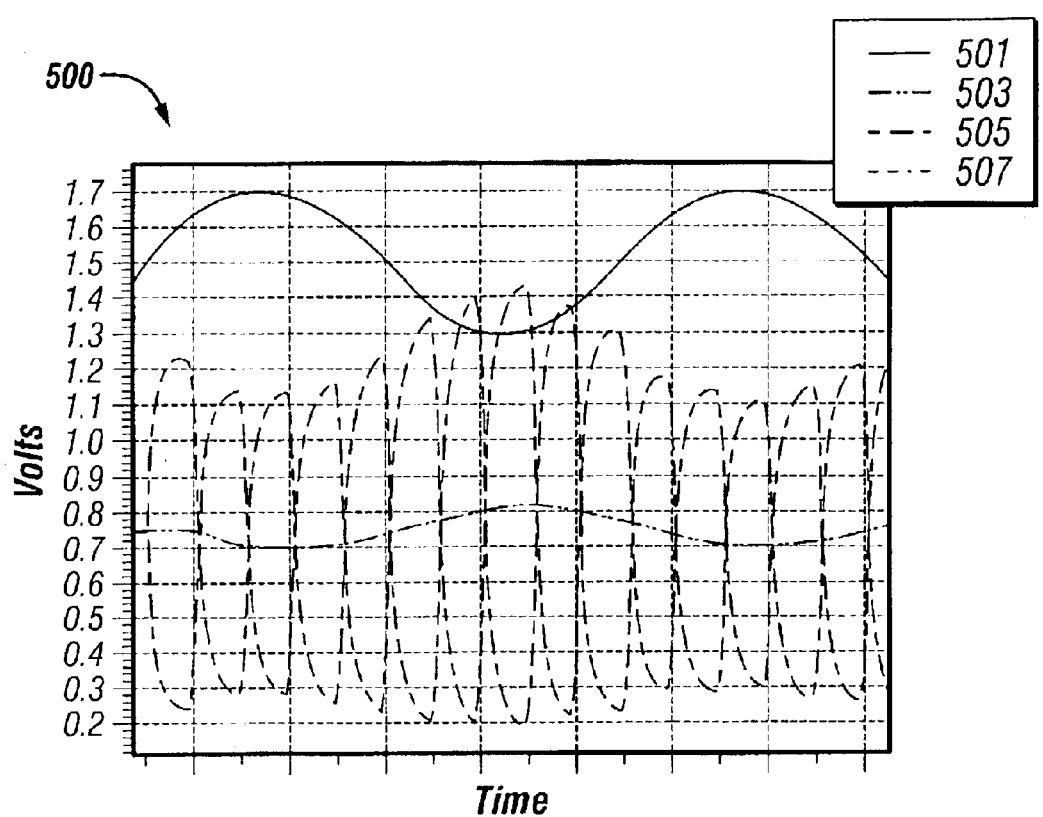
FIG. 5 shows a timing diagram of a reference voltage potential circuit in accordance with an embodiment of the present invention.

FIG. 5 shows a timing diagram (500) of a reference voltage potential circuit in accordance with an embodiment of the present invention. The power supply difference signal (501) shows the absolute difference between power supplies $V_{DD}$ and $V_{SS}$, for example, the absolute difference between power supplies (401, 403) shown in FIG. 4. A reference voltage signal (503) shows a reference voltage potential resulting from a voltage divider circuit, for example, the voltage divider using R1 (402) and R2 (404) shown in FIG. 4. The reference voltage signal (503) is dependent on the differential clock signals, signal (505) and signal (507). For example, the differential clock signals could be differential clock signals, CQ signal (405) and CQbar signal (407), shown in FIG. 4.

The value of the reference voltage signal (503) is approximately centered between the values of the differential clock signals, signal (505) and signal (507). The differential clock signals, signal (505) and signal (507), have a characteristic that is not consistent with the characteristics of the power supply difference signal (501). The reference voltage signal (503) does have a characteristic that is consistent with the characteristics of the differential clock signals, signal (505) and signal (507). The value of the reference voltage signal (503) serves as a reference voltage for a comparator that receives an input signal with similar characteristics as the differential clock signals, signal (505) and signal (507). For example, the data signal (301) shown in FIG. 3 may have characteristics similar to the differential clock signals, clock signal (303) and clockbar signal (305), shown in FIG. 3. Accordingly, the reference voltage signal (503) is positively correlated to the input signal, for example, the data signal (301) shown in FIG. 3.

Figure 6:
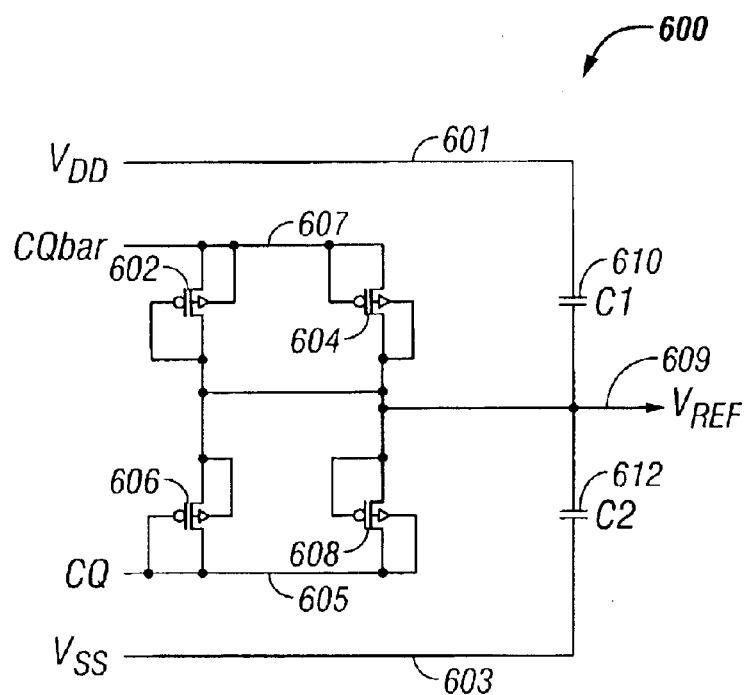
FIG. 6 shows a schematic diagram of a reference voltage potential circuit in accordance with an embodiment of the present invention.

FIG. 6 shows a schematic diagram of a reference voltage potential circuit (600) in accordance with an embodiment of the present invention. Differential clock signals, CQ signal (605) and CQbar signal (607), ideally have a 180 degree phase shift relative to each other. The differential clock signals continuously toggle between a first state and a second state. Toggling of the differential clock signals produces voltage potentials that may be identified as different states.

The differential clock signals (i.e., CQ signal (605) and CQbar signal (607)) are input to a full-wave rectifier circuit. The full-wave rectifier circuit includes p-channel transistors (602, 604, 606, 608). All of the p-channel transistors (602, 604, 606, 608) are connected to function as diodes. For example, when a voltage potential on the CQbar signal (607) is greater than a voltage potential on a voltage reference signal line (609) by the threshold voltage of the p-channel transistor (602), the p-channel transistor (602) allows current to flow between the voltage potential on the CQbar signal (607) and the voltage potential on the voltage reference signal line (609). The orientation of the diodes formed from the p-channel transistors (604, 608) are opposite of the orientation of the p-channel transistors (602, 606).

When the absolute difference between the voltage potential on the CQbar signal (607) versus the voltage potential on the CQ signal (605) is greater than two times the threshold voltage of the p-channel transistors (602, 604, 606, 608), current flows through one branch of the full-wave rectifier circuit. A branch of the full-wave rectifier circuit includes either p-channel transistors (602, 606) or p-channel transistors (604, 608). Current flow in either branch biases the voltage potential on the voltage reference signal line (609) to half of the absolute average between the voltage potential on the CQbar signal (607) and the voltage potential on the CQ signal (605).

In other words, if the voltage potential on the CQbar signal (607) minus the threshold voltage of the combined p-channel transistors (602, 606) is greater than the voltage potential on the CQ signal (605), current flows through the p-channel transistors (602, 606). If the voltage potential on the CQbar signal (607) plus the threshold voltage of the combined p-channel transistors (604, 608) is less than the voltage potential on the CQ signal (605), current flows through the p-channel transistors (604, 608).

In FIG. 6, power supplies $V_{DD}$ (601) and $V_{SS}$ (603) are charge-coupled to the reference voltage potential, $V_{REF}$, on the voltage reference signal line (609) to provide a low-pass filter of the reference voltage potential, $V_{REF}$. When current flows through either branch, the capacitors C1 (610) and C2 (612) are charged and help maintain a constant reference voltage potential, $V_{REF}$, on the voltage reference signal line (609). In other words, the capacitors C1 (610) and C2 (612) perform a low-pass filter operation.

One of ordinary skill in the art will understand that the use of p-channel transistors (602, 604, 606, 608) having a low threshold voltage advantageously allow the p-channel transistors to turn "on" at a reduced voltage. A low threshold voltage enables a reduced voltage potential swing necessary on the CQbar signal (607) and the CQ signal (605).

One of ordinary skill in the art will understand that both of the signals, CQ signal (605) and CQbar signal (607) may not continuously toggle. Both the CQ signal (605) and CQbar signal (607) may be at a fixed voltage potential. Both CQ signal (605) and CQbar signal (607) may toggle for a limited time duration then maintain a fixed voltage potential, or vice versa. The reference voltage potential circuit (600) operates properly if a the CQ signal (605) and the CQbar signal (607) are complementary or maintain a consistent voltage potential.

Figure 7:
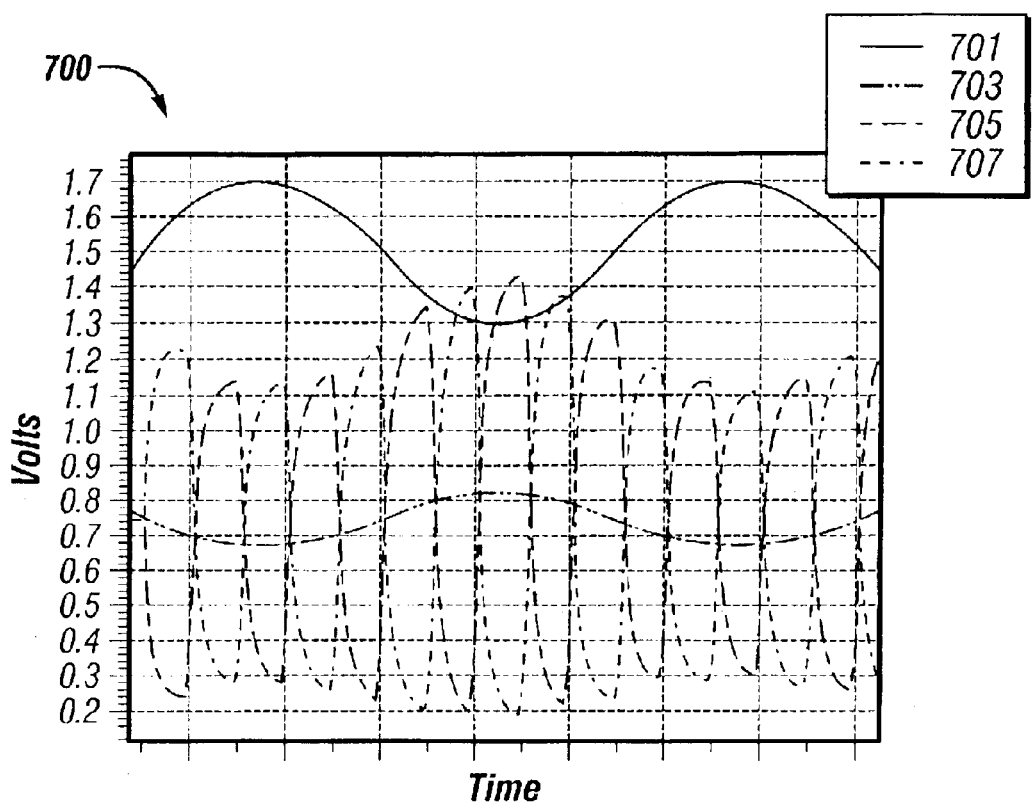
FIG. 7 shows a timing diagram of a reference voltage potential circuit in accordance with an embodiment of the present invention.

FIG. 7 shows a timing diagram (700) of a reference voltage potential circuit in accordance with an embodiment of the present invention. The power supply difference signal (701) shows the absolute difference between power supplies $V_{DD}$ and $V_{SS}$, for example, the absolute difference between power supplies (601, 603) shown in FIG. 6. A reference voltage signal (703) shows a reference voltage potential resulting from a full-wave rectifier circuit, for example, the full-wave rectifier circuit using the p-channel transistors (602, 604, 606, 608) shown in FIG. 6. The reference voltage signal (703) is dependent on the differential clock signals, signal (705) and signal (707). For example, the differential clock signals could be differential clock signals, CQ signal (605) and CQbar signal (607), respectively, shown in FIG. 6.

The value of the reference voltage signal (703) is approximately centered between the values of the differential clock signals, signal (705) and signal (707). The differential clock signals, signal (705) and signal (707), have a characteristic that is not consistent with the characteristics of the power supply difference signal (701). The reference voltage signal (703) does have a characteristic that is consistent with the characteristics of the differential clock signals, signal (705) and signal (707). She value of the reference voltage signal (703) serves as a reference voltage for a comparator that receives an input signal with similar characteristics as the differential clock signals, signal (705) and signal (707). For example, the data signal (301) shown in FIG. 3 may have characteristics similar to the differential clock signals, clock signal (303) and clockbar signal (305), shown in FIG. 3. Accordingly, the reference voltage signal (703) is positively correlated to the input signal, for example, the data signal (301) shown in FIG. 3.

Figure 8:
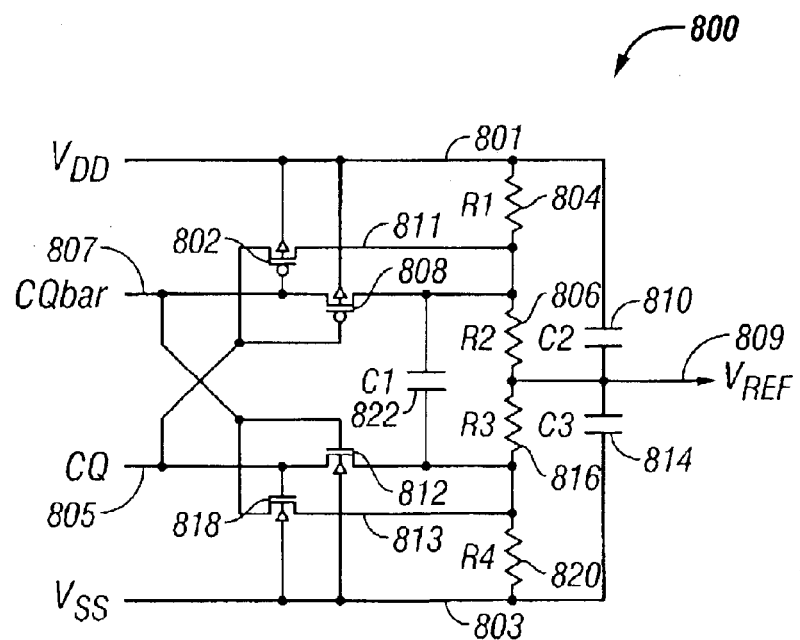
FIG. 8 shows a schematic diagram of a reference voltage potential circuit in accordance with an embodiment of the present invention.

FIG. 8 shows a schematic diagram of a reference voltage potential circuit (800) in accordance with an embodiment of the present invention. Differential clock signals, CQ signal (805) and CQbar signal (807), ideally have a 180 degree phase shift relative to each other. The differential clock signals continuously toggle between a first state and a second state. Toggling of the differential clock signals produces voltage potentials that may be identified as different states.

The differential clock signals (i.e., CQ signal (805) and CQbar signal (807)) are input to a synchronous, full-wave rectifier circuit. The synchronous, full-wave, rectifier circuit includes p-channel transistors (802, 808), n-channel transistors (812, 818), and resistors R1 (804), R2 (806), R3 (816), and R4 (820).

The p-channel transistors (802, 808) are connected such that a high voltage potential is maintained on a signal line (8.11) during operation of the synchronous, full-wave rectifier circuit. Because the CQbar signal (807) and CQ signal (805) are differential, if the CQbar signal (807) has a high voltage potential, the CQ signal (805) has a low voltage potential, and vice versa.

Accordingly, if the CQbar signal (807) has a high voltage potential, the p-channel transistor (802) connected to the CQbar signal (807) is "off." Because the CQ signal (805) has a low voltage potential, the p-channel transistor (808) connected to the CQ signal (805) is "on." The high voltage potential on the CQbar signal (807) is allowed to transmit through the p-channel transistor (808) to the signal line (811). If the CQbar signal (807) has a low voltage potential, the p-channel transistor (802) connected to the CQbar signal (807) is "on." Because the CQ signal (805) has a high voltage potential, the p-channel transistor (808) connected to the CQ signal (805) is "off." The high voltage potential on the CQ signal (805) is allowed to transmit through the p-channel transistor (802) to the signal line (811).

The n-channel transistors (812, 818) are connected such that a low voltage potential is maintained on a signal line (813) during operation of the synchronous, full-wave rectifier circuit. Because the CQbar signal (807) and CQ signal (805) are differential, if the CQbar signal (807) has a high voltage potential, the CQ signal (805) has a low voltage potential, and vice versa.

Accordingly, if the CQbar signal (807) has a high voltage potential, the n-channel transistor (812) connected to the CQbar signal (807) is "on." Because the CQ signal (805) has a low voltage potential, the n-channel transistor (818) connected to the CQ signal (805) is "off." The low voltage potential on the CQ signal (805) is allowed to transmit through the n-channel transistor (812) to the signal line (813). If the CQbar signal (807) has a low voltage potential, the n-channel transistor (812) connected to the CQbar signal (807) is "off." Because the CQ signal (805) has a high voltage potential, the n-channel transistor (818) connected to the CQ signal (805) is "on." The low voltage potential on the CQbar signal (807) is allowed to transmit through the n-channel transistor (818) to the signal line (813).

The resistors R2 (806) and R3 (816) form a voltage divider circuit between the high voltage potential on signal line (811) and the low voltage potential on signal line (813). The average or weighted average of the high voltage potential on signal line (811) and the low voltage potential on signal line (813) created by the voltage divider circuit generates the reference voltage potential, $V_{REF}$, on the voltage reference signal line (809).

The resistor R1 (804) connects between a power supply $V_{DD}$ (801) and the signal line (811). The resistor R4 (820) connects between a power supply $V_{SS}$ (803) and the signal line (813). The resistors R1 (804) and R4 (820) provide a bias if the driving of the CQ signal (805) and CQbar signal (807) by a transmitting circuit has not been started. This may be the case, for example, when a communication system first powers up. A communication system includes at least one transmitting circuit and at least one receiving circuit.

In FIG. 8, the power supplies $V_{DD}$ (801) and $V_{SS}$ (803) are charge-coupled to the reference voltage potential, $V_{REF}$, on the voltage reference signal line (809) to provide a low-pass filter of the reference voltage potential, $V_{REF}$. Capacitors C2 (810) and C3 (814) are charged and help maintain a constant reference voltage potential, $V_{REF}$, on the voltage reference signal line (809). In other words, the capacitors C2 (810) and C3 (814) perform a low-pass filter operation. A capacitor C1 (822) is connected between signal line (811) and signal line (813) to help maintain the voltage potential difference between the voltage potentials on signal line (811) and signal line (813).

One of ordinary skill in the art will understand that both the CQbar signal (807) and the CQ signal (805) have a positive voltage potential swing that is greater than the voltage potential on the signal line (813) by at least a threshold voltage of the n-channel transistor (812) and the n-channel transistor (818). Both the CQbar signal (807) and the CQ signal (805) have a negative voltage potential swing that is less than the voltage potential on the signal line (811) by at least a threshold voltage of the p-channel transistor (802) and the p-channel transistor (808). Use of p-channel transistors (802, 808) and n-channel transistors (812, 818) that have a low threshold voltage will advantageously allow the p-channel transistors (802, 808) and n-channel transistors (812, 818) to turn "on" with a reduced voltage. A low threshold voltage enables a reduced voltage potential swing necessary on the CQbar signal (807) and the CQ signal (805).

One of ordinary skill in the art will understand that both of the signals, CQ signal (805) and CQbar signal (807) may not continuously toggle. Both the CQ signal (805) and CQbar signal (807) may be at a fixed voltage potential. Both CQ signal (805) and CQbar signal (807) may toggle for a limited time duration then maintain a fixed voltage, potential, or vice versa. The reference voltage potential circuit (800) operates properly if a the CQ signal (805) and the CQbar signal (807) are complementary or maintain a consistent voltage potential.

One of ordinary skill in the art will understand that one of the signals, CQ signal (805) and CQbar signal (807) may be disconnected from the reference voltage potential circuit (800). By continuing to toggle, the remaining signal, CQ signal (805) or CQbar signal (807), maintains a reference voltage potential, $V_{REF}$, on the voltage reference signal line (809) while the disconnected signal has a voltage potential that "floats."

Figure 9:
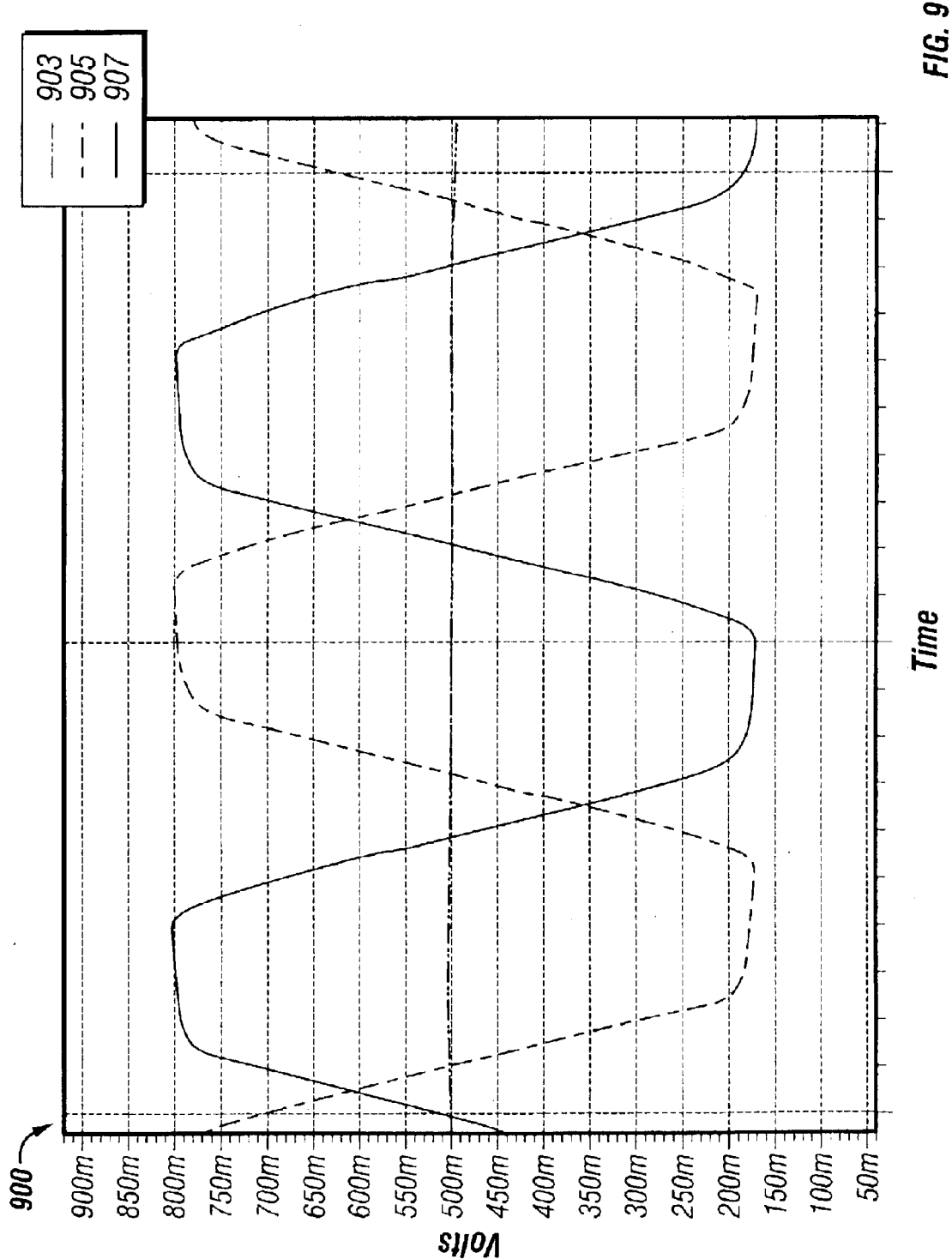
FIG. 9 shows a timing diagram of a reference voltage potential circuit in accordance with an embodiment of the present invention.

FIG. 9 shows a timing diagram (900) of a reference voltage potential circuit in accordance with an embodiment of the present invention. A reference voltage signal (903) shows a reference voltage potential resulting from a synchronous, full-wave rectifier circuit, for example, the synchronous, full-wave rectifier circuit shown in FIG. 8. The reference voltage signal (903) is dependent on the differential clock signals, signal (905) and signal (907). For example, the differential clock signals could be differential clock signals, CQ signal (805) and CQbar signal (807), respectively, shown in FIG. 8.

Ideally, the differential clock signals, signal (905) and signal (907) have a 180 degree phase shift relative to each other. In an embodiment of the present invention, signal (905) and signal (907) are phased shifted by 154 degrees. The value of the reference voltage signal (903) is approximately centered between the values of the differential clock signals, signal (905) and signal (907). The small ripple in the reference voltage signal (903) is due to the signal (905) and signal (907) having a phase shifted by 154 degrees. A phase shift of 180 degrees between the signal (905) and signal (907) results in the reference voltage signal (903) without ripple.

The reference voltage signal (903), resulting from the 154 degree phase shifted signals (905, 907), has a characteristic that is consistent with the characteristics of the differential clock signals, signal (905) and signal (907). The value of the reference voltage signal (903) is a good reference voltage for a comparator that receives an input signal with similar characteristics as the differential clock signals, signal (905) and signal (907). For example, the data signal (301) shown in FIG. 3 may have characteristics similar to the differential clock signals, clock signal (303) and clockbar signal (305), shown in FIG. 3. Accordingly, the reference voltage signal (903) is positively correlated to the input signal, for example, the data signal (301) shown in FIG. 3.

Advantages of the present invention may include one or more of the following. In one or more embodiments, because a differential clock signal is used to generate a reference voltage potential, the reference voltage potential may accurately track the characteristics of an input signal's voltage potential.

In one or more embodiments, because a reference voltage potential circuit resides on the same integrated circuit (i.e., receiving circuit) as a comparator, both circuits may be similarly affected by a semiconductor process, temperature, voltage, and input termination impedance. By having characteristics that affect both the reference voltage potential circuit and the comparator, a reference voltage potential generated by the reference voltage potential circuit may accurately track the variations in the comparator.

In one or more embodiments, the frequency characteristics of a differential clock signal used to generate a reference voltage potential may be similar to the frequency characteristics of an input signal. The differential clock signal and input signal are generated by a transmitting circuit. Any effects such as semiconductor process variations, temperature, voltage, attenuation due to parasitics, signal noise due to coupling with other signals, and/or power supply noise due to active switching of circuit elements may similarly affect both the differential clock signal, hence the reference voltage potential, and the input signal. The reference voltage potential generated by a reference voltage potential circuit may accurately track the variations in the input signal.

In one or more embodiments, the transmitting circuit may not have the same power supply voltage potentials as the receiving circuit. The power supply voltage potential difference may be due to variation in the implementation of the communication system. The power supply voltage potential difference may be due to a specific design objective. The differential signals used to generate the reference potential are generated by the transmitting circuit. Further, the differential signals are responsive to the transmitting circuit's power supply voltage potential. Likewise, a data signal transmitted by the transmitting circuit is responsive to the transmitting circuit's power supply voltage potential. Advantageously, the receiving circuit, using the differential signals generated by the transmitting circuit, generates a reference voltage potential relative to the voltage potential range of the data signal transmitted by the transmitting circuit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A communication system, comprising:
   a transmitting circuit disposed on a first integrated circuit and arranged to generate a data signal, a first signal, and a second signal, wherein the first signal and the second signal are out of phase with each other; and
   a receiving circuit disposed on a second integrated circuit, wherein the receiving circuit comprises:
      a reference voltage circuit arranged to generate a reference voltage potential dependent on the first signal and the second signal, wherein power supplies of the receiving circuit are charge-coupled to the reference voltage potential, and
      a circuit arranged to generate an output signal dependent on the reference voltage potential and the data signal.

2. The communication system of claim 1, wherein the reference voltage circuit comprises a low-pass filter for filtering the reference voltage potential.

3. The communication system of claim 2, wherein the low-pass filter comprises a capacitor.

4. The communication system of claim 1, wherein the first signal is complementary to the second signal, and wherein the first signal and the second signal continuously toggle between a first state and a second state.

5. The communication system of claim 1, wherein the reference voltage circuit comprises a voltage divider.

6. The communication system of claim 5, wherein the voltage divider comprises at least one resistive element.

7. The communication system of claim 1, wherein the reference voltage circuit comprises a full-wave rectifier circuit.

8. The communication system of claim 7, wherein the full-wave rectifier circuit comprises a plurality of diodes.

9. The communication system of claim 7, wherein the full-wave rectifier circuit comprises a plurality of metal oxide semiconductor field effect transistors.

10. The communication system of claim 1, wherein the reference voltage circuit comprises a synchronous, full-wave rectifier circuit.

11. The communication system of claim 10, wherein the synchronous, full-wave rectifier circuit comprises at least one p-channel transistor and at least one n-channel transistor.

12. A communication system, comprising:
   a first input arranged to receive a first signal from a transmitting circuit;
   a second input arranged to receive a second signal from the transmitting circuit;
   a reference voltage circuit located on an integrated circuit and arranged to generate a reference voltage potential, comprising:
      a first p-channel transistor, wherein the first p-channel transistor's gate is operatively connected to the first input;
      a second p-channel transistor, wherein the second p-channel transistor's gate is operatively connected to the second input;
      a first n-channel transistor, wherein the first n-channel transistor's gate is operatively connected to the first input; and
      a second n-channel transistor, wherein the second n-channel transistor's gate is operatively connected to the second input, and wherein the transmitting circuit is not formed on the integrated circuit; and
   a comparator located on the integrated circuit and arranged to generate an output signal dependent on the reference voltage potential and an input signal voltage potential generated from the transmitting circuit.

13. A method for generating a reference voltage in a communication system, comprising:
   inputting a first signal generated from a transmitting circuit;
   inputting a second signal generated from the transmitting circuit;
   generating a voltage reference potential dependent on the first signal and the second signal, wherein the generating occurs on an integrated circuit, and wherein the transmitting circuit is not formed on the integrated circuit;
   filtering the voltage reference potential with a power supply charge-coupled to the voltage reference potential; and
   generating an output signal dependent on the voltage reference potential and an input signal voltage potential generated from the transmitting circuit.

14. The method circuit of claim 13, wherein the comparing is performed using the integrated circuit.

15. The method of claim 13, wherein the second signal is complementary to the first signal, and wherein the first signal and the second signal continuously toggle between a first state and a second state.

16. The integrated circuit of claim 13, wherein the generating comprises low-pass filtering.

17. The integrated circuit of claim 16, wherein the low-pass filtering uses a capacitor.

18. The method of claim 13, wherein the generating uses a voltage divider.

19. The method of claim 18, wherein the voltage divider uses at least one resistive element.

20. The method of claim 13, wherein the generating uses a full-wave rectifier circuit.

21. The method of claim 20, wherein the full-wave rectifier circuit comprises a plurality of diodes.

22. The method of claim 20, wherein the full-wave rectifier circuit comprises a plurality of metal oxide semiconductor field effect transistors.

23. The method of claim 13, wherein the generating uses a synchronous, full-wave rectifier circuit.

24. The method of claim 23, wherein the synchronous, full-wave rectifier circuit comprises at least one p-channel transistor and at least one n-channel transistor.

25. A communication system, comprising:
   means for inputting a first signal generated from a transmitting circuit;
   means for inputting a second signal generated from the transmitting circuit; and
   means for generating a voltage reference potential dependent on the first signal and the second signal, wherein the generating occurs on an integrated circuit, and wherein the transmitting circuit is not formed on the integrated circuit;
   means for filtering the voltage refernce potential with a power supply charge-coupled to the reference voltage potential; and
   means for outputting an output signal dependent on the voltage reference potential and an input signal voltage potential generated from the transmitting circuit.

* * * * *